3,198,851
POLYURETHANES FROM NON-HYDROXYL POLY-EPOXIDES, BF₃-AMINE CATALYST AND ALTERNATIVELY A VINYL CHLORIDE CONTAINING RESIN
Kenneth L. Hoy, St. Albans, W. Va., assignor to Union Carbide Corporation, a corporation of New York
No Drawing. Filed Feb. 23, 1961, Ser. No. 90,922
19 Claims. (Cl. 260—836)

This invention relates to novel polymerizable, curable compositions of matter for producing polyurethanes; polymerized, cured polyurethane compositions produced therefrom and methods of producing the same. In one aspect, this invention relates to polymerizable, curable compositions of matter comprising (a) a substantially hydroxyl-free monomeric polyepoxide, (b) an organic polyisocyanate and (c) a boron trifluoride-amine complex; to methods of polymerizing and curing said compositions and to the cured polyurethanes thereby obtained.

The use of reaction products from hydroxyl containing polyesters, polyethers, etc. and multifunctional isocyanates (said products known in the art as polyurethanes) in coatings, castings, laminates, adhesives, foams and other applications is well known in the art. One of the major problems in developing universally acceptable performance for these systems has been to overcome the short working lives which they exhibit. The working lives of the aforementioned systems frequently are of such limited duration that gelation of the system occurs before the materials can be used. One known method of solving this problem developed by other prior workers in the art, involves the use of so-called "masked" or "blocked" isocyanates in order to increase the working life of the system. The "masked" or "blocked" isocyanates are prepared by reacting isocyanate with phenols, alcohols, acetoacetic esters, malonic esters, and other known masking agents; and will decompose when heated, liberating the active isocyanate component which then crosslinks with the hydroxyl containing moiety. However, systems containing "masked" isocyanates have the serious disadvantage of requiring a toxic and/or expensive masking agent (for example, phenol) which is necessarily liberated and volatilized when the system is put to actual use. Furthermore, most of the masked isocyanates are solid materials and hence must necessarily be applied from solution, with the result that they cannot be used in all applications.

It is an object of this invention to provide novel polymerizable and curable compositions for producing polyurethanes which compositions have excellent shelf stability and longer working lives than the aforementioned prior art compositions.

It is another object of this invention to provide novel compositions which when heated readily polymerize and subsequently become cured to produce polyurethanes and which, nevertheless, have excellent shelf stability and are capable of being utilized without requiring expensive and toxic solvents and/or masking agents often necessary in prior art compositions.

It is a further object of this invention to provide a method for polymerizing and curing said novel compositions so as to produce polyurethane products excellently suited for use in coating, casting, laminating, molding and resin arts.

The novel compositions of this invention also include and are directed to the polymerized and cured compositions referred to above.

Other objects of this invention will be apparent to those skilled in the art after referring to the more detailed description of the invention which follows.

It has been found that the above-mentioned objects may be accomplished on the basis of the discovery that polyurethane compositions can be obtained by heating, in the presence of a catalyst, a substantially hydroxyl-free monomeric polyepoxide and an organic polyisocyanate in such proportions as to give from about 0.05 to about 1.5 isocyanate groups for each epoxide group, and preferably 0.15 to 0.7 isocyanate groups for each epoxide group. The terms "polyepoxide" and "polyisocyanate," as used herein, mean compounds having two or more epoxide and isocyanate groups, respectively, in each molecule. As used herein, the term "epoxide group" means those groups having an oxygen atom bonded to two adjacent carbon atoms, as represented by the formula

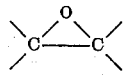

Epoxides themselves are not reactive with isocanates under ordinary conditions, but when under the influence of certain catalytic agents, the epoxide rings can be opened to form hydroxyl groups or a chemical entity capable of further reaction with isocyanate groups. Catalysts that have been found satisfactory for the purposes of this invention are boron trifluoride-amine complexes which when heated decompose to form the active catalyst boron trifluoride and the corresponding amine. Thus, it is possible according to this invention to prepare mixtures of substantially hydroxyl-free monomeric polyepoxide, organic polyisocyanate and catalyst; which mixtures are stable at room temperature for considerable periods of time and which nevertheless, when heated, are rapidly and smoothly reacted to form a polyurethane. The principal distinction between the known prior art compositions and the compositions of this invention is the use of substantially hydroxyl-free monomeric polyepoxides as ingredients in polyurethane-forming systems.

Although it is not intended to limit the invention thereby, it is believed that the urethane-forming reactions are probably represented by the following equations:

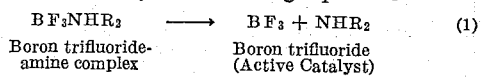

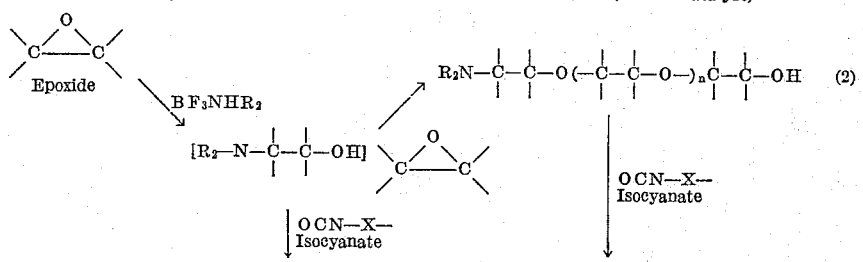

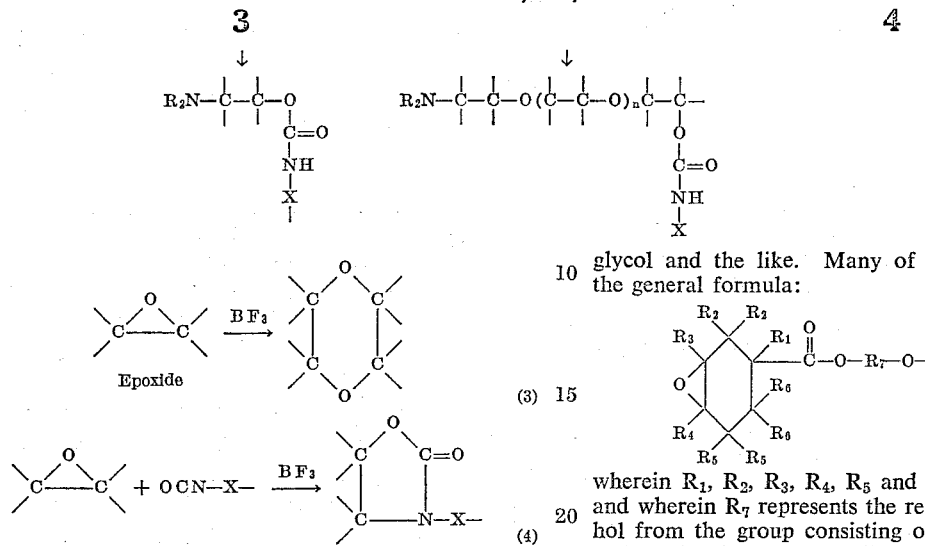

(3)

(4)

When multifunctional epoxides and multifunctional isocyanates are used, Reactions (2), (3), and (4) will produce polymers.

The physical properties of the polyurethanes obtained from these novel compositions of matter may be varied according to any particular need by proper selection of the three basic ingredients, that is, the polyepoxide, organic polyisocyanate and catalyst. Compositions can be prepared from which polyurethanes ranging from very hard, tough, scratch resistant, solvent resistant, etc., materials to very soft, pliable materials can be obtained. Compositions can be prepared which are suitable for use in coating applications when used in conjunction with known coatings materials such as alkyd resins, vinyl resins, urea formaldehyde resins, etc. The epoxy-isocyanate systems of this invention can be used in the processing or compounding of vinyl polymers and copolymers as convertible plasticizers or as additives to promote adhesion, gloss, light stability, heat stability and other desirable coatings properties. Polyurethane products obtained by curing these novel compositions of matter can be machined and polished, thereby permitting use of the uncured systems in the preparation of molding compositions as well as for adhesives, protective coating, castings and the like.

Virtually any monomeric polyepoxide can be used, either singly or in combination, in the practice of this invention. Certain compounds which have been found to be particularly suited include the following:

(1) Diepoxides of cycloaliphatic esters, said epoxides having the general formula:

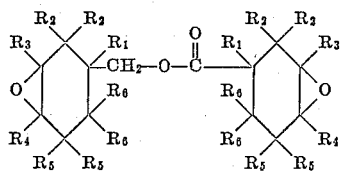

wherein $R_1$, $R_2$, $R_3$, $R_4$, $R_5$ and $R_6$ represent either hydrogen or an alkyl group, preferably a lower alkyl group, that is, an alkyl group containing from one to six carbon atoms. These compounds and their preparation are described in U.S. Patent 2,716,123. Most particularly preferred epoxides included within this group of compounds are 3,4-epoxycyclohexylmethyl 3,4-epoxycyclohexanecarboxylate; 1-methyl-3,4-epoxycyclohexyl-methyl 1-methyl-3,4-epoxycyclohexanecarboxylate; 6-methyl-3,4-epoxycyclohexylmethyl 6-methyl-3,4-epoxycyclohexanecarboxylate; and 3,4-epoxy-(3 and/or 4)-methylcyclohexylmethyl 3,4-epoxy-(3 and/or 4)-methylcyclohexanecarboxylate;

(2) Polyesters of 3,4-epoxycyclohexanecarboxylic acid and a polyol including etheric glycols such as, for example, diethylene glycol, triethylene glycol, dipropylene glycol and the like. Many of these polyesters, having the general formula:

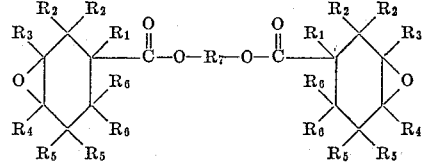

wherein $R_1$, $R_2$, $R_3$, $R_4$, $R_5$ and $R_6$ are as defined above and wherein $R_7$ represents the residue of a dihydric alcohol from the group consisting of lower aliphatic hydrocarbon glycols or polyoxyalkylene glycols of the formula:

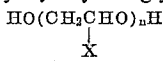

where X is hydrogen or a methyl group and where $n$ is a positive integer in the range of from 2 through 3, are described in U.S. Patent 2,745,847. Polyols other than those mentioned in said patent, from which these polyesters can be prepared, include 2,2-diethyl-1,3-propanediol; 1,6-hexanediol; 3-methyl-1,5-pentanediol; 1,1,1-trimethylolpropane; glycerol; erythritol; pentaerythritol and the like. Most particularly preferred epoxides within this group are those wherein the acid from which the polyesters are prepared is 3,4-epoxycyclohexanecarboxylic acid; 1-methyl-3,4-epoxycyclohexanecarboxylic acid or 6-methyl-3,4-epoxycyclohexanecarboxylic acid.

(3) Polyesters of 3,4-epoxycyclohexylmethanol and an organic polycarboxylic acid, including aliphatic and aromatic polycarboxylic acids. Many of the diesters included within this group of particularly suitable epoxide compounds are shown in U.S. Patents 2,750,395 and 2,863,881 and correspond to the general formula:

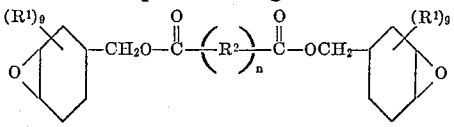

wherein each $R^1$ individually represents either hydrogen or alkyl, preferably lower alkyl or from 1 to 6 carbon atoms, wherein $R^2$ represents a divalent organic hydrocarbon radical containing from 1 to 10 carbon atoms, and wherein $n$ is either zero or one. Included within this group of diesters are those where $R_8$ is derived from an aliphatic dicarboxylic acid such as oxalic acid, maleic acid, succinic acid and the like or from an aromatic dicarboxylic acid such as phthalic acid, terphthalic acid, isophthalic acid and the like. Polyesters within this embodiment of the invention can also be prepared from di-, tri-, or polycarboxylic acids other than those mentioned in the above patents such as, for example, suberic acid, azelaic acid, alkyl substituted succinic acids, itaconic acid, fumaric acid, diglycolic acid, hemimellitic acid, trimellitic acid, pyromellitic acid, mellitic acid and the like. Most particularly preferred epoxides within this group include those polyesters derived from 3,4-epoxycyclohexylmethanol and 6-methyl-3,4-epoxycyclohexylmethanol.

(4) Bis(3,4-epoxycyclohexylmethyl) ether and related epoxides of the general formula:

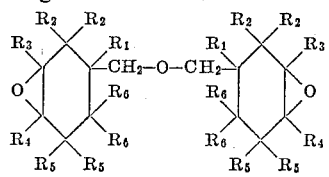

wherein any one or more of $R_1$ through $R_6$ represents hydrogen or an alkyl group, and preferably a lower alkyl group (one to six carbon atoms). These ethers can be prepared from starting materials readily obtainable through procedures well known in the chemical literature. These include the steps of preparing cyclohexenecarboxaldehydes by the known Diels-Alder condensation of a suitable diene such as butadiene or one of its homologues (isoprene or 1,3-pentadiene for example) with an alpha, beta-unsaturated aldehyde such as acrolein, methacrolein, crotonaldehyde or the like. The cyclohexenecarboxaldehyde is then reduced with aluminum isopropoxide and isopropanol to form the corresponding cyclohexenemethanol of the formula:

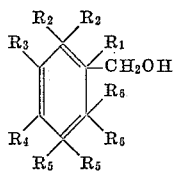

wherein $R_1$ through $R_6$ have the same significance as above. Reaction of the cyclohexenemethanol with thionyl chloride ($SOCl_2$) yields cyclohexenylmethylchloride. A further portion of the same cyclohexenemethanol, or of a cyclohexenemethanol having substituents in other ring positions, when reacted with metallic sodium in accordance with well known methods yields the sodium alcoholate of said alcohol. Cyclohexenylmethyl ethers are then prepared by the reaction of cyclohexenylmethylchloride and the sodium alcoholate of a cyclohexenemethanol (the well known Williamson synthesis of ethers). When the alcoholate is derived from the same cyclohexenemethanol used for preparing the cyclohexenylmethylchloride a symmetrical ether is formed; otherwise a mixed ether is prepared. In any event, the ether is then oxidized in accordance with well known procedures (see, for example, U.S. Patent 2,745,847 mentioned above) to epoxidize the olefinic linkages contained in the said ethers, whereby epoxy ethers of the general formula shown above are obtained.

(5) Glycidyl ethers of polyhydric phenols such as, for example, the diglycidyl ether of 2,2-bis (para-hydroxyphenyl) propane and the like.

(6) 3,4 - epoxy - 6 - methylcyclohexylmethyl-9,10-epoxy stearate and related epoxides as described in U.S. Patent 2,779,771.

Other monomeric polyepoxides which can be used in the practice of this invention include the glycidyl ethers and alkyl substituted glycidyl ethers of aldanediols such as the diglycidyl ethers of 1,5-hexanediol; 1,5-pentanediol; 1,4-butanediol; 1,3-propanediol, 2-methyl pentane-2,5-diol, and the like. Similarly the glycidyl ethers of other polyhydroxy compounds such as, for example, diethylene glycol, triethylene glycol, pentaerythritol, glycerol and the like can be used. The essential characteristic of these ethers which must be present for purposes of this invention is the substantial absence of any residual free hydroxyl moiety in the polyepoxide ingredient; that is, the polyol must be substantially completely etherified.

Polyepoxides other than those previously mentioned, which also may be used in preparing these novel compositions, include the epoxy esters of polycarboxylic acids such as, for example, the glycidyl esters of phthalic acid, terephthalic acid, succinic acid, adipic acid, oxalic acid, glutaric acid, isophthalic acid, trimellitic acid, and the like. Again, the essential precaution that must be satisfied is that the epoxy ester used be substantially free of any hydroxyl groups.

Other monomeric polyepoxides which can be used include the monomeric products obtained by oxidizing dienes; for example, the polyepoxide oxidation products obtained from butadiene, pentadienes, hexadienes, alkyl substituted butadiene, pentadiene or hexadiene; and the like. Such oxidations can be accomplished by known methods, as described for example in the U.S. patents mentioned hereinabove.

The term "substantially hydroxyl-free" epoxide as used herein, is meant to include all epoxides which have, because of the complete or nearly complete absence of any hydroxyl moiety, useful shelf life, when combined with the isocyanate moiety at ordinary room temperature, for time periods of from a few hours up to six months or longer. No specific numerical limitation can be assigned which will achieve these results. It is obvious that in those compositions of this invention for which a very long shelf life and a low viscosity is required, the epoxide used must have the lowest possible hydroxyl content; while in those compositions for which a somewhat shorter shelf life and/or a higher viscosity can be tolerated, the hydroxyl content may be somewhat higher. The essence of this invention is in any event the use, in organic isocyanate containing compositions, of monomeric polyepoxides which are sufficiently devoid of hydroxyl groups that the subsequent reaction of the hydroxyl groups with the isocyanate moiety will not produce such an increase in viscosity of the mixture as to render the mixture unusable; but which will under the influence of heat and a catalyst as defined herein, become readily reactive with the said isocyanate.

Any organic diisocyanate or polyisocyanate can be used. Compounds found to be particularly well adapted for use in this invention include 2,4-toluenediisocyanate, hexamethylene diisocyanate, 4,4'-methylene di-ortho-tolylisocyanate, PAPA-1 (a polyaryl polyisocyanate sold by the Carwin Company), products containing terminal isocyanate groups formed by reacting diisocyanates and polyfunctional alcohols (for example, hexane-1,3-diol), and the like. Other organic polyisocyanates which can be used in these novel compositions include xylylene diisocyanate; 1-methyl-2,4-diisocyanate cyclohexane; phenylene diisocyanate; diphenyl methane-4,4'-diisocyanate, naphthalene-1,5-diisocyanate, triphenyl methane-4,4',4"-triisocyanate, 3,3'-dimethyl-4,4' biphenylene diisocyanate, 2,2',5,5'-tetramethyl-4,4' biphenylene diisocyanate, 4,4'-methylenebis (phenyl isocyanate, ethylene diisocyanate, trimethylenediisocyanate, benzene-1,3,5-triisocyanate, toluene-2,4,6-triisocyanate, diphenyl-2,4,4'-triisocyanate and the like. Mixtures of organic polyisocyanates can be used in these novel compositions, if desired.

Catalytic agents for the purpose of this invention are boron trifluoride-amine complexes which are stable at room temperature but dissociate at higher temperatures to form free boron trifluoride (which acts as the active catalyst) and the corresponding amine. The concentration of the boron trifluoride-amine can vary from trace amounts to as much as five percent or more (by weight), based upon the amount of polyepoxide used. Preferred catalyst concentration is from 0.05 to 3.0 percent by weight, depending upon the boron trifluoride content of the catalyst and the application in which the epoxy-isocyanate system is to be used. Amounts of catalyst above five percent to ten percent by weight do not materially improve the properties of the materials obtained. Excessive amounts of catalyst, however, tend to shorten the shelf life of the composition. For example, when the composition is to be used as a convertible plasticizer component in chloride containing compositions the preferred limits are 0.8 to 1.5 percent, based on the weight of the epoxide, of boron trifluoride-piperidine. At higher concentrations of $BF_3 \cdot C_5H_{11}N$ the convertible compositions obtained are incompatible with vinyl chloride polymers and copolymers. For castings compositions where hard, scratch resistant, etc. products are desired, three to five percent of $BF_3 \cdot C_5H_{11}N$ is the preferred concentration.

Especially preferred catalysts for the purposes of this invention are boron trifluoride-piperidine, boron trifluoride-ethylamine, boron trifluoride-isopropylamine and boron trifluoride-triethanolamine.

Other suitable catalysts which can be used include boron fluoride-amine complexes where the amine component is methylamine, dimethylamine, diethanolamine, 2-ethylehexylamine, phenylenediamine, toluidine, diphenylamine, and the like.

The process of this invention is carried out, generally, by heating to a temperature within the range of from about 60° centigrade to about 300° centigrade a mixture comprising substantially hydroxyl-free monomeric polyepoxide, organic polyisocyanate and boron trifluoride-amine complex (as catalyst) in the proportions hereinbefore described.

For most purposes the preferred polymerization temperature will be between about 100° centigrade and 200° centigrade. Since the catalysts used in this invention are chosen to be stable at room temperature but dissociable at temperatures above about 60° centigrade to form free boron trifluoride (the active catalyst) it will be apparent to those skilled in the art that the temperature required for the polymerization to take place is therefore directly related to the temperature required for appreciable dissociation of the specific boron trifluoride-amine used.

The time of heating required for gelation of the polyurethane product to occur will usually vary from several minutes up to several hours, depending upon the particular reaction temperature used. Curing of the gelated product can be allowed to proceed at the reaction temperature selected, or can be, if desired, accelerated by raising the temperature of the polymerized and gelled product up to 200° centigrade or more. It has been found that the product can usually be completely cured in less than about 24 hours, and often in less than 3 or 4 hours, depending upon the cure temperature and the catalyst concentration employed.

In utilizing a monomeric polyepoxide as a convertible plasticizer for poly(vinyl chloride) in accordance with the method of the present invention, there are a number of important parameters which must be kept in mind.

In the preparation of plastisol [1] formulation, the monomeric polyepoxide employed must be a liquid, preferably having a viscosity below about 6000 centipoises at 25° centigrade. In formulations where it is desired to have high vinyl chloride contents, for example, 70 percent and higher, the lower the viscosity of the polyepoxide employed the better, in order to obtain a plastisol having a workable consistency. Among the problems attendant with a plastisol having too high a viscosity is the difficulty in expelling all of the air entrapped in the formulation.

Another essential characteristic of a monomeric polyepoxide employed as a convertible plasticizer in a plastisol formulation is that said polyepoxide must not solvate (or appreciably swell) the vinyl chloride containing polymer at temperatures below about 50° centigrade, but at the same time must be capable of solvating, gelling and promoting fusion of the plastisol into a compatible, homogeneous mass at temperatures in the range of about 90°–200° centigrade. The polyepoxide must also cure within a relatively short time, that is, from about 5–30 minutes, at the fusion temperature in order to avoid excessive degradation of the vinyl chloride containing polymer.

In the event the liquid material (plasticizer) contains reactive groups which are capable of undergoing polymerization, a wide spectrum of products are obtainable, ranging from those which are soft and flexible (plasticized) materials to those which are hard and more or less rigid materials, depending upon the choice of the reactive liquid material.

Monomeric polyepoxides which have been found to be particularly suitable for utilization in plastisol formulations include:

3,4-epoxycyclohexylmethyl 6-methyl-3,4-epoxycyclohexylmethyl ether;
Bis (3,4-epoxy-6-methylcyclohexylmethyl) adipate;
Bis (3,4-epoxy-6-methylcyclohexylmethyl) sebacate;
2-ethyl-1,3-hexanediol bis (3,4-epoxycyclohexanecarboxylate)
didecyl-4,5-epoxycyclohexane-1,2-dicarboxylate;
3,4-epoxycyclohexylmethyl 9,10,12,13-diepoxystearate;
3,4-epoxy-6-methylcyclohexylmethyl 3,4-epoxy-6-methylcyclohexanecarboxylate; and the like.

Most organic polyisocyanates are suitable for use in plastisol formulation. The polyisocyanate must be a liquid or a solid that is readily soluble in the monomeric polyepoxide, and in either case, must be compatible with the polyepoxide. In addition, the isocyanate must not solvate the poly(vinyl chloride) at room temperature.

Operable catalysts for plastisols include any $BF_3$-amine complex that is stable at room temperature but which decomposes at fusion temperature to form active $BF_3$. The catalyst can either be dissolved in the epoxide or dispersed as a solid if it is not soluble.

The amount of vinyl chloride containing polymer in the plastisol formulation can be varied over a wide range, from about 10 percent to about 80 percent by weight of the total formulation. Actually, the principal limitation on the upper portion of the range is the viscosity of the monomeric polyepoxide. If a low viscosity polyepoxide such as 3,4-epoxycyclohexylmethyl 6-methyl-3,4-epoxycyclohexylmethyl ether (viscosity of about 150 centipoises at 25° centigrade) is employed, a plastisol formulation having vinyl chloride containing polymer in amounts even higher than 80 percent by weight is still workable. At the lower end of the range the only practical limit is that point at which the vinyl chloride containing polymer begins to have a diminishing effect on the properties of the cured product. This has been found to be about 10 percent by weight of the total formulation. In this end of the range, that is, at about 10 percent by weight vinyl chloride containing polymer the cured product is substantially a polyurethane that has been toughened by incorporation of a high molecular weight thermoplastic resin in the formulation.

By way of comparison, in plasisol formulations employing a non-convertible (non-reactive) plasticizer such as dioctyl phthalate, it is rare that the amount of vinyl chloride containing polymer is lower than about 50 percent by weight of the total formulation. This is the case because of the adverse effect the liquid, non-reactive material has on the strength of the gelled product.

In organosol [2] formulations the requirements are much the same except that the monomeric polyepoxide can be of higher viscosity, since this is balanced by the addition of the organic thinner. Slightly higher amounts of vinyl chloride containing polymer can be employed since the viscosity of the formulation is reduced by addition of thinner.

In addition to plastisols and organosols, the polymerizable and curable compositions that are the subject of this

---

[1] A plastisol is generally defined as a dispersion of vinyl chloride containing polymer in a liquid, substantially non-volatile material, which, when heated, is transformed from the dispersion to a homogeneous solid mass. The liquid material (plasticizer) imparts softness and resiliency to the vinyl chloride containing polymer, that is, it "plasticizes" the polymer.

[2] An organosol is a plastisol that has been thinned by addition of a volatile, non-reactive, organic liquid such as di-isobutyl ketone and/or toluene. The liquid thinner must be substantially a non-solvent for the vinyl chloride containing polymer and is eliminated from the formulation during the fusion step.

invention can be employed in combination with vinyl chloride containing polymers in solvent systems. The vinyl chloride containing polymer can either be dissolved in a monomeric polyepoxide or the whole formulation can be dissolved in an organic non-reactive solvent. Organic solvents suitable for this purpose are acetone, methyl ethyl ketone, methyl ethyl ketone/toluene, methyl isobutyl ketone, and the like. Obviously, the non-solvating restriction on the monomeric polyepoxide which is present in plastisol formulations is not applicable to solvent systems, and when the formulation is dissolved in an organic non-reactive solvent, the viscosity restriction is also not applicable. Again, however, the formulation must be capable of forming a compatible, homogeneous mass when cured.

In solvent systems the proportions of vinyl chloride containing polymer to the polyepoxide/polyisocyanate/catalyst moiety can be varied over an even wider range than in the plastisol and organosol formulations. The lower limit is again about 10 percent by weight, based on the total weight of the formulation (excluding non-reactive solvents). As above, this is approximately the point at which lower concentrations of vinyl chloride containing polymer begin to have diminishing effect on the properties of the cured product. The upper limit is related to viscosity only where the vinyl chloride containing polymer is dissolved in the monomeric polyepoxide. Here, the upper limit is about 50 percent by weight. However, when the entire formulation is dissolved in an organic solvent, vinyl chloride containing polymer in amounts as high as about 95 percent by weight of the reactants can be employed.

The principal utility of the above mentioned plastisol formulations is in preparation of cast and molded articles. The organosols and solvent systems are chiefly utilized in surface coatings, but can also be employed in production of cast and molded articles.

In general, the vinyl chloride containing resins which can be employed in the preparation of plastisols and organosols are known in the art as dispersion grade resins, and have an intrinsic viscosity falling in the range of from about 2 to about 3.

The vinyl chloride containing resins which can be employed in solvent systems have an intrinsic viscosity falling in the range of from about 0.1 to about 0.7.

The intrinsic viscosity of a resin is indicative of the molecular weight of the resin, and is determined by comparing the viscosity of a dilute solution of the resin in a solvent with the viscosity of the pure solvent. Intrinsic viscosity is the value of the intercept of a plot of reduced viscosity against resin concentration in the solvent (in grams per 100 milliliters). Reduced viscosity is in turn determined by dividing the specific viscosity of the resin by the concentration of the resin as shown in the following equation.

$$\text{Reduced viscosity} = \frac{\text{Viscosity of resin in solvent} - \text{viscosity of solvent}}{\text{viscosity of solvent}}$$
$$\overline{\text{Concentration of resin in solvent (in grams per 100 milliliters)}}$$

Reduced viscosities are usually measured by using a capillary viscometer. The time of flow ($T_2$) of a dilute solution of resin in the solvent (0.2 gram of resin per 100 milliliters of solvent) and the time of flow ($T_1$) of the pure solvent are measured. The reduced viscosity then is indicated by the formula:

$$\text{Reduced viscosity} = \frac{\frac{T_2 - T_1}{T_1}}{C} = \frac{T_2 - T_1}{T_1 C}$$

where C=concentration of resin in the solvent in grams per 100 milliliters. A discussion of these viscosity principles and their relation to resin molecular weights is shown in Doolittle, "The Technology of Solvents and Plasticizers" (1956) pp. 782–84.

The following non-limiting specific examples will further illustrate the practice of this invention. In the examples, all parts are parts by weight unless otherwise specified.

EXAMPLE 1.—PREPARATION OF 6-METHYL-3-CYCLOHEXENYLMETHYL CHLORIDE 126 grams of 6-methyl-3-cyclohexene-1-methanol were added dropwise over a period of 10 to 15 minutes to 147 grams of 90 percent thionyl chloride contained in a 2-liter, 4-necked flask equipped with a stirrer, thermometer, dropping funnel and a variable tube off distillation head. The flask was maintained at 15° to 20° centigrade during the addition period by using an ice bath. When addition was completed the temperature was slowly raised to 100° centigrade and held at about that temperature for 1.5 hours. The system was then attached to a water aspirator and the pressure lowered to about 30 to 40 millimeters of mercury, absolute, while the temperature was maintained in a range of from about 85° to about 100° centigrade, resulting in a smooth decomposition of the chlorosulfite reaction product and consequent distillation of 92 grams of crude 6-methyl-3-cyclohexenylchloride which was condensed and recovered. The crude liquid product was treated with 30 grams of anhydrous potassium carbonate, filtered and redistilled. The redistillation product was found to be liquid 6-methyl-3-cyclohexenylmethylchloride having a boiling point of 70° to 73° centigrade at 13.5 millimeters of mercury, absolute, and a refractive index, $n_D$ at 30° centigrade, of 1.755. Elemental analysis of the product gave the following results:

|  | Percent by Weight | |
| --- | --- | --- |
|  | Found | Theoretical |
| Carbon | 66.72, 66.70 | 66.4 |
| Hydrogen | 9.12, 9.14 | 9.06 |
| Chlorine | 24.12, 24.24 | 24.5 |

EXAMPLE 2.—PREPARATION OF DI(6-METHYL-3-CYCLOHEXENYLMETHYL) ETHER

Forty-six grams of clean metallic sodium was dissolved in 900 grams of 6-methyl-3-cyclohexenemethanol contained in a 2-liter flask equipped with a stirrer, reflux condenser and dropping funnel. As the metallic sodium was gradually added, the temperature was maintained between about 80° and 110° centigrade. After all the sodium had dissolved, 289 grams of 6-methyl-3-cyclohexenylmethylchloride were added over a period of one hour, while maintaining the temperature in the same range of between about 80° to about 110° centigrade. During the addition period sodium chloride began to precipitate. The reaction mixture was maintained at a temperature between about 110° and about 120° centigrade for an additional 72 hours, and was then cooled and filtered. The filtrate was fractionally distilled, yielding 240 grams of liquid di(6-methyl-3-cyclohexenylmethyl) ether having a boiling point of 90° to 95° centigrade at 0.25 millimeter of mercury, absolute; and a refractive index, $n_D$ at 30° centigrade, of 1.4841. Elemental analysis showed the following results:

|  | Percent by Weight | |
|---|---|---|
|  | Found | Theoretical |
| Carbon | 82.30, 82.38 | 82.0 |
| Hydrogen | 11.05, 11.14 | 11.18 |

In similar manner, one can readily prepare symmetrical or mixed ethers of numerous substituted and unsubstituted cyclohexenylmethyl alcohols, in turn prepared in accordance with procedures indicated hereinabove. The preparation of these various unsaturated cycloaliphatic alcohols is also shown in U.S. Patent 2,750,395, dated June 12, 1956.

EXAMPLE 3.—PREPARATION OF (3-CYCLOHEXENYLMETHYL) (6-METHYL-3-CYCLOHEXENYLMETHYL) ETHER

By following procedures similar to those shown in Example 2, 259 grams of (3-cyclohexenylmethyl) (6-methyl-3-cyclohexenylmethyl) ether were obtained by dissolving 46 grams of metallic sodium in about 800 grams of 3-cyclohexene-1-methanol and then adding 289 grams of 6-methyl-3-cyclohexene-1-methylchloride. The (3-cyclohexenylmethyl) (6-methyl-3-cyclohexenylmethyl) ether product had a boiling point of about 107° centigrade at 0.3 millimeter of mercury, absolute; a refractive index, $n_D$ at 30° centigrade, of 1.4858; and on elemental analysis showed the following results:

|  | Percent by Weight | |
|---|---|---|
|  | Found | Theoretical |
| Carbon | 81.67, 82.00 | 81.76 |
| Hydrogen | 11.08, 11.16 | 10.90 |

EXAMPLE 4.—PREPARATION OF DI (6-METHYL-3,4-EPOXYCYCLOHEXYLMETHYL) ETHER 213 grams of di (6-methyl-3-cyclohexenylmethyl) ether was placed in a 2-liter, 4-necked flask equipped with a stirrer, reflux condenser, thermometer and a dropping funnel. The contents of the flask were heated to a temperature of about 50° centigrade and about 600 grams of 29 percent solution of peracetic acid in ethyl acetate (about 174 grams of peracetic acid) were added over a period of 3.5 hours. The exothermic reaction was controlled by maintaining the temperature of the flask at about 40° centigrade with an ice bath. After all the peracetic acid solution had been added the reaction mixture was maintained at 40° centigrade for an additional 1.5 hours, at which time the mixture was cooled and stored overnight at −10° centigrade. The following day the reaction mixture was azeotropically distilled with ethyl benzene to remove residual acetic acid and then the ethyl benzene was removed by distilling at 95° centigrade and 5 millimeters of mercury absolute. The 254 grams of residue analyzed as 76.8 percent di (6-methyl-3,4-epoxycyclohexylmethyl) ether by determination of epoxy groups. Flash distillation of 45 grams of this residue at 0.15 millimeter of mercury, absolute and 260° centigrade gave 19 grams of liquid di (6-methyl-3,4-epoxycyclohexylmethyl) ether which crystallized on standing to yield a solid product having a melting point range of from 30° to 60° centigrade.

EXAMPLE 5.—PREPARATION OF (3,4-EPOXYCYCLOHEXYLMETHYL) (6-METHYL - 3,4 - EPOXYCYCLOHEXYLMETHYL) ETHER

In a manner similar to that described in Example 4, 254 grams of (3-cyclohexenylmethyl) (6-methyl-3-cyclohexenylmethyl) ether were treated at 40° centigrade with about 790 grams of a 27.6 percent solution of peracetic acid (about 218 grams of peracetic acid) in ethyl acetate. The product was azeotropically distilled with ethyl benzene to remove residual acetic acid and the ethyl benzene then was removed by distillation at about 80° centigrade and 10 millimeters of mercury, absolute. The 299 grams of residue analyzed as 82 percent (3,4-epoxycyclohexylmethyl) (6-methyl-3,4-epoxycyclohexylmethyl) ether by determination of epoxy groups. Flash distillation of 53 grams of this residue at 232° centigrade and 0.5 millimeter of mercury, absolute yielded 30 grams of liquid (3,4-epoxycyclohexylmethyl) (6-methyl - 3,4 - epoxycyclohexylmethyl) ether having a refractive index, $n_D$ at 30° centigrade, of 1.4881 and a viscosity of 152.9 centistokes at 25° centigrade. Use of this epoxide in the preparation of polyvinyl chloride plastisol films is shown in Example 66, below.

EXAMPLES 6–9

In these examples, compositions capable of being polymerized and cured to produce polyurethanes were prepared by mixing 3,4-epoxy-6-methyl-cyclohexylmethyl-3,4-epoxy-6-methylcyclohexanecarboxylate with increasing amounts of 2,4-toluenediisocyanate and with boron trifluoride-ethylamine in the proportions indicated in the table below. Each of the mixtures so prepared became warm (temperatures rising spontaneously to 30°–35° centigrade) but remained fluid for several hours. When the mixtures were heated at 177° centigrade they gelled within 2–10 minutes to form hard, insoluble, scratch-resistant, yellow resins having Barcol hardness values as indicated in Table 1 when tested in a Barcol impressor (Model GYZ1 934–1).

*Table 1*

| Example | Grams of Diepoxide | Grams of Diisocyanate | Grams of $BF_3 \cdot C_2H_5NH_2$ | Barcol Hardness |
|---|---|---|---|---|
| 6 | 14 | 0.87 | 0.3 | 45 |
| 7 | 14 | 1.74 | 0.3 | 50 |
| 8 | 14 | 2.61 | 0.3 | 52 |
| 9 | 14 | 4.35 | 0.5 | 77 |

EXAMPLES 10–18

In the following examples a series of polyurethanes was prepared from mixtures containing between 0.05 and 0.80 isocyanate group for each epoxide group and also containing boron trifluoride-piperidine catalyst in amounts equal to about 3 percent by weight of the monomeric polyepoxide used. The polyepoxide and organic polyisocyanate components in each instance were the same materials as those used in Examples 6–9 above. Polyurethane products were prepared from each of the mixtures by gelling for 10 minutes at 135° centigrade followed by a curing period of 16 hours at 160° centigrade. Barcol hardness values were determined in a Barcol Model GYZI–1 impressor as in Examples 6–9. In addition heat distortion temperatures were determined according to the procedures of ASTM method O–648–45T. Results are shown in Table II below:

*Table II*

| Example | Grams of Diepoxide | Grams of Diisocyanate | Ratio-Isocyanate Groups to Expoxide Groups | Grams of $BF_3 \cdot C_6H_{11}N$ | Barcol Hardness | Heat Distortion Temperature (°C.) |
|---|---|---|---|---|---|---|
| 10 | 42 | 1.27 | .05 | 1.26 | 53 | 105 |
| 11 | 42 | 2.61 | .10 | 1.26 | 50 | 132 |
| 12 | 42 | 5.22 | .20 | 1.26 | 55 | 128 |
| 13 | 42 | 7.83 | .30 | 1.26 | 57 | 126 |
| 14 | 42 | 10.04 | .40 | 1.26 | 57 | 122 |
| 15 | 28 | 8.00 | .50 | 0.84 | 61 | 129 |
| 16 | 28 | 10.44 | .60 | 0.84 | 60 | 160 |
| 17 | 28 | 12.18 | .70 | 0.84 | 60 | 166 |
| 18 | 28 | 13.92 | .80 | 0.84 | 60 | 162 |

In comparison with the polyurethanes obtained in Examples 10–13, a product obtained from a similar mixture from which the polyisocyanate component had been omitted gave a Barcol hardness of 36 and had a heat distortion temperature of less than about 98° centigrade.

EXAMPLES 19–21

Polyurethanes were prepared from three separate mixtures containing 14 grams of 3,4-epoxy-6-methylcyclohexylmethyl 3,4-epoxy-6 - methylcyclohexanecarboxylate, 0.42 gram of boron trifluoride-piperidine complex and 1.39, 2.78 and 4.27 grams respectively of 4,4′-methylene di-ortho-tolylisocyanate by heating each of said mixtures for 10 minutes at a temperature of about 177° centigrade. The polyurethane resins so prepared were hard, insoluble, scratch-resistant and amber in color. Respective Barcol hardness values were 47, 45 and 47.

EXAMPLES 22–24

Three polyurethanes were prepared according to the procedures described in Examples 19–21 above. The isocyanate used was a polyaryl polyisocyanate made by the Carwin Company and having an amine equivalent of 141 (sold under the name PAPI–1) in respective amounts of 1.41, 2.84 and 4.23 grams. All other ingredients were used in the same amounts described in Examples 14–16. The resulting resins were hard, insoluble, scratch-resistant and dark amber in color. Barcol hardness values were 52, 53 and 51 respectively.

EXAMPLES 25–27

In these examples the isocyanate ingredient of the novel compositions of this invention was a diol-diisocyanate adduct. This adduct was prepared by adding, over a period of 4–5 hours, 219 parts (by weight) of 2-ethyl-1,3-hexane-diol to 504 parts (by weight) of hexamethylene diisocyanate contained in a round bottom flask fitted with a reflux condenser, a dropping funnel, and a mechanical stirrer. During the entire addition period the temperature of the reacting mixture was maintained below 70° centigrade. After addition of the diol was completed the temperature was raised to 100° centigrade for two hours. The product was then cooled to room temperature. A liquid material having a viscosity of 6700–7000 centipoises and an amine equivalent of 268–270 was recovered. Three mixtures containing 14 grams of 3,4-epoxy - 6 - methylcyclohexylmethyl 3,4 - epoxy - 6-methylcyclohexanecarboxylate, 0.42 gram of boron trifluoride-piperidine complex, and 2.70, 5.40 and 8.10 grams, respectively, of the diisocyanate-diol adduct (prepared as described above) were made. These mixtures after being heated for 10 minutes at about 177° centigrade yielded hard, scratch-resistant, insoluble, amber-colored polyurethane resins. Barcol hardness of the polyurethane resins produced decreased as the amount of diisocynate-diol adduct in the pre-polymer compositions was increased. Specific Barcol hardness values were 40, 36 and 34 respectively.

EXAMPLE 28

Fourteen parts of 3,4-epoxy-6-methylcyclohexylmethyl 3,4-epoxy-6-methylcyclohexanecarboxylate were mixed with 2.18 parts of 2,4-tolylene diisocyanate and 0.2 part of boron trifluoride-isopropylamine complex which was dissolved in 1.8 parts of the bis(2,3-epoxy-2-methylpropyl)ether of a poly(oxyethylene) glycol having an average molecular weight of about 200. The mixture was heated for 10 minutes at 177° centigrade. The resultant polyurethane resin was hard, insoluble, scratch-resistant, yellow in color and had a Barcol hardness of 53.

EXAMPLE 29

A polymerizable, curable composition of matter was prepared by adding 2.18 parts of 2,4-tolylenediisocyanate and 0.52 part of $BF_3 \cdot C_6H_{11}N$ complex to 17.4 parts of the diglycidyl ether of bis(2,2′-para-hydroxyphenyl) propane. A hard, insoluble, amber-colored polyurethane resin was formed by heating this mixture at about 177° centigrade for 10 minutes.

EXAMPLES 30–32

Three compositions were prepared by mixing 20 grams of bis (3,4-epoxy - 6 - methylcyclohexylmethyl) adipate, 0.6 gram of $BF_3 \cdot C_6H_{11}N$ complex, and 0.88, 1.76 and 2.64 grams, respectively, of 2,4-toluenediisocyanate. The polyurethane resins obtained by heating these mixtures for 10 minutes at about 177° centigrade were hard, insoluble, scratch-resistant and amber-colored. The respective Barcol hardness values were 26, 33 and 25.

EXAMPLES 33–50

The following examples show the wide variety of epoxide compounds which may be used in the practice of this invention and the polyurethane resin products obtainable therefrom. In these examples various diepoxides were mixed with $BF_3 \cdot C_6H_{11}N$ complex in proportions as indicated in the following Table III. Each of these mixtures was heated until it became homogeneous (50°–70° centigrade) and then allowed to cool to room temperature. Sufficient toluenediisocyanate (0.44 gram) was then added to each batch so as to provide 0.5 isocyanate groups per each epoxide group. The time required for each of the resulting mixtures to gel when heated to 80° centigrade was then observed, following which the polyurethane resins so obtained were cured and properties observed as indicated in Table III.

Table III

| Example | Epoxide Used [1] | Grams of Epoxide | Percent of $BF_3 \cdot C_6H_{11}N$ (Based on Weight of Epoxide) | Time Required to Gel at 80° Centigrade | Cure Cycle [2] | Description of Cured Product | Barcol Hardness of Product |
|---|---|---|---|---|---|---|---|
| 33 | A | 0.9 | 1.9 | 4 min | 3, 2.5, 6 | Amber, tough | 21 |
| 34 | B | 1.3 | 1.9 | Less than 2 min | Same as Ex. 33 | ___do___ | 42 |
| 35 | C | 1.4 | 2.0 | 7 hrs | 13, 8, 6 | ___do___ | -- |
| 36 | D | 1.7 | 1.9 | Less than 2 min | Same as Ex. 34 | ___do___ | 31 |
| 37 | E | 2.1 | 2.0 | 11 hrs. at 80° C. and 1 hr. at 120° C. | 11, 8, 6 | Amber, flexible | |
| 38 | F | 1.0 | 5.1 | 6 min | 1, 2.5, 6 | Brown tough | |
| 39 | G | 1.0 | 5.0 | 15 min | Same as Ex. 38 | Amber, brittle | |
| 40 | H | 0.9 | 4.9 | 15 min | Same as Ex. 39 | Brown, tough | |
| 41 | I | 0.8 | 5.3 | 5.7 hrs | 11, 8, 6 | Amber, brittle | |
| 42 | J | 0.7 | 5.0 | 9 min | 0.5, 2.5, 6 | ___do___ | |
| 43 | K | 0.8 | 4.9 | 4 min | Same as Ex. 42 | Black, tough | |
| 44 | L | 1.4 | 4.8 | 3 min | Same as Ex. 42 | Amber, brittle | |
| 45 | M | 1.3 | 2.0 | Less than 2 min | Same as Ex. 42 | Yellow, brittle | |
| 46 | N | 1.1 | 5.0 | ___do___ | Same as Ex. 42 | Amber, tough | 36 |
| 47 | O | 0.9 | 5.0 | 2 min | Same as Ex. 33 | ___do___ | |
| 48 | P | 0.7 | 5.0 | Less than 2 min | Same as Ex. 33 | ___do___ | |
| 49 | Q | 0.8 | 5.1 | 13 hrs. at 80° C. and 1 hr. at 120° C. | Same as Ex. 35 | Amber, brittle | |
| 50 | R | 1.1 | 1.0 | 11 hrs. at 80° C. and 1 hr. at 120° C. | Same as Ex. 37 | Amber, tough | 36 |

[1] Epoxides used in Examples 33–46
 A—Diglycidyl ether of Ethylene glycol
 B—3,4-epoxycyclohexylmethyl 3,4 - epoxycyclohexanecarboxylate
 C—3,4-epoxy-1-methylcyclohexylmethyl 3,4-epoxy-1-methylcyclohexanecarboxylate
 D—Bis(3,4-epoxycyclohexylmethyl) oxalate
 E—3,4-epoxy-6-methylcyclohexylmethyl 9,10-epoxy stearate
 F—1,2-Bis(2,3-epoxy-2-methyl(propoxy) ethane)
 G—4,5-epoxypentyl 4,5-epoxy pentoate
 H—Diglycidyl acetal
 I—Dipentene dioxide
 J—1,2,5,6-diepoxy cyclooctane
 K—Glycidyl 2,3-epoxy cyclopentyl ether
 L—3,9-bis-(1,2-epoxy-1-methylethyl) spirobi (meta dioxane)
 M—Bis(3,4-epoxycyclohexyl) sulfone
 N—2,3-epoxypropyl 8-(4-oxatetra cyclo $(4.4.1^{7,10}.0^{1,6}.0^{3,5})$ undecyl) ether
 O—Bis(2,3-epoxycyclopentyl) ether
 P—vinylcyclohexene dioxide
 Q—dicyclopentadiene dioxide
 R—divinyl benzene dioxide

[2] In the cure cycle data the first number represents hours at 80° centigrade; the second number, hours at 120° centigrade; and the last number, hours at 160° centigrade.

The remaining examples furnish illustrations of applications wherein the polymerizable compositions of this invention are used in combination with vinyl resins as plasticizers and/or modifiers therefor.

EXAMPLE 51

This example illustrates the use of these novel compositions as convertible plasticizers in poly(vinyl chloride) plastisol films.

A mixture was prepared containing 10 parts of 2-ethyl-1,3-hexanediol bis(3,4-epoxycyclohexanecarboxylate), 10 parts of didecyl 4,5-epoxycyclohexane-1,2-dicarboxylate, 4 parts of 2,4-toluenediisocyanate and 0.2 part of boron trifluoride-piperidine complex. Ten parts of poly(vinyl chloride) (plastisol grade QYNV) was added to 10 parts of the above mixture and the final mixture was stirred until a smooth paste was obtained. The paste was placed under a vacuum to remove any air present and then a film was cast on a glass surface. After baking for 10 minutes at 350° Fahrenheit a clear, flexible, dry film was recovered.

EXAMPLES 52–55

In a manner similar to that described in the foregoing Example 51, mixtures were prepared containing poly(vinyl chloride) resin (QYNV), 2,4-toluenediisocyanate, boron trifluoride-piperidine complex, didecyl 4,5-epoxycyclohexane-1,2-dicarboxylate and bis(3,4-epoxy-6-methylcyclohexylmethyl) adipate in the proportions indicated in the following Table IV. Films were cast from these mixtures at 7 mils (.007 inch) wet thickness and then baked at 350° Fahrenheit for 10 minutes. Certain properties of these films are shown in Table IV.

Table IV

| Ex. | Plasticizer Mixture | | | | Parts of Plasticizer Mix Per 100 Parts of Poly(vinyl chloride) Resin (QYNV) | Baked Film Properties | | | |
|---|---|---|---|---|---|---|---|---|---|
| | Grams of Epoxide X [1] | Grams of Epoxide Y [2] | Grams of TDI [3] | Grams of $BF_3 \cdot C_6H_{11}N$ | | Tensile [4] Strength, pounds per square inch | Elongation, Percent | Percent Extraction | |
| | | | | | | | | Hydrocarbon [5] | Water [6] |
| 52 | 19.0 | 1.0 | 2.5 | 0.2 | 80 | 3,700–4,300 | 55–60 | 6.91 | 0.00 |
| 53 | 21.0 | 9.0 | 3.5 | 0.3 | 80 | 3,300–3,600 | 300–400 | 10.34 | 0.58 |
| 54 | 21.0 | 9.0 | 3.5 | None | 80 | 3,300–3,600 | 500–560 | 25.3 | 7.3 |
| 55 | 21.0 | 9.0 | None | 0.3 | 80 | 3,300–3,500 | 510–550 | 19.8 | 3.14 |
| Control | (Dioctyl phthalate as plasticizer) | | | | 80 | 2,530 | 514 | 37.0 | 0.064 |

[1] Bis(3,4-epoxy-6-methylcyclohexylmethyl) adipate.
[2] Didecyl 4,5-epoxycyclohexane-1,2-dicarboxylate.
[3] 2,4-toluenediisocyanate.
[4] Scott tensile tester.
[5] Percent weight loss of 5 mil (.005 inch) film after soaking 10 days (at 25° Centigrade) in Apco thinner.
[6] Percent weight loss of 5 mil (.005 inch) film after soaking 10 days (at 25° Centigrade) in distilled water.

The baked films of Examples 53 through 55 were prepared from plastisol mixtures having identical formulations except that $BF_3$-piperidine was left out of the formulation in Example 54 and 2,4-toluenediisocyanate was left out of Example 55. While the tensile strengths of the cured films in these three examples are identical to one another, the cured films of Examples 54 and 55 exhibit significantly higher elongation and hydrocarbon and water extraction. This is an illustration of the improvement in properties imparted to a poly(vinyl chloride) plastisol formulation by the polyepoxide/organic polyisocyanate/ $BF_3$-amine mixtures which are the subject of this invention, and also clearly illustrates the fact that all three components are necessary in order to realize this improvement.

EXAMPLES 56–60

Table V below shows result of tests on films prepared as described in Examples 51–55 above from mixtures containing monomeric polyepoxide, polyisocyanate, boron trifluoro-piperidine complex and poly(vinyl chloride) resin (QYNV) in the proportions indicated, which mixtures were prepared in a manner similar to that described in Example 51. Film properties were determined in the same manner as described in Examples 52–55.

EXAMPLES 67–69

The following examples show the utility of the novel polyurethane forming compositions in combination with polymerized vinyl compounds in solution coating mixtures.

A mixture of 20 parts bis(3,4-epoxy-6-methylcyclohexylmethyl) adipate, 0.2 part of boron trifluoridepiperidine and 4.41 parts of 2,4-toluenediisocyanate was prepared. This mixture was added to a 20 percent solution of VYHH in a 50–50 mixture of toluene and methyl-isobutyl ketone in the proportions indicated in Table VII. (VYHH is a poly(vinyl chloride-vinyl acetate) copolymer containing 86 weight percent vinyl chloride and 14 weight percent vinyl acetate and having an intrinsic viscosity of 0.56.) Wedge shape films were cast on unprimed steel (can makers quality), allowed to air dry for 20–30 minutes, and baked for 30 minutes at 250° Fahrenheit. Adhesion characteristics of these cast film coatings were determined. Data is shown in Table VII below.

*Table V*

| Ex. | Plasticizer Mixture | | | | Parts of Plasticizer Mix Per 100 Parts of Resin (QYNV) | Film Properties | | | |
|---|---|---|---|---|---|---|---|---|---|
| | Grams of Epoxide X[1] | Grams of Epoxide V[2] | Grams of TDI[3] | Grams of $BF_3C_6H_{11}N$ | | Tensile Strength, pounds per square inch | Elongation, Percent | Percent Extraction | |
| | | | | | | | | Apco Thinner | Water |
| 56 | 20.0 | | 4.41 | 0.2 | 80 | 6,300 | 11 | 0.0 | .298 |
| 57 | 15.0 | 5.0 | 4.38 | 0.2 | 80 | 5,000 | 13 | 0.0 | .248 |
| 58 | 10.0 | 10.0 | 4.35 | 0.2 | 80 | 3,350 | 48 | 6.24 | .182 |
| 59 | 5.0 | 15.0 | 4.31 | 0.2 | 80 | 3,200 | 192 | 9.32 | .314 |
| 60 | | 20.0 | 4.20 | 0.2 | 80 | 3,600 | 252 | 17.4 | .996 |
| Control | (Dioctyl Phthalate Plasticizer) | | | | 80 | | | 37.0 | 0.064 |

[1] Bis(3,4-epoxy-6-methylcyclohexylmethyl) adipate.
[2] 3,4-epoxycyclohexylmethyl 9,10,12,13-diepoxy stearate.
[3] 2,4-toluenediisocyanate.

EXAMPLES 61–66

The following examples, shown in Table VI below illustrate the use of these novel polyurethane compositions as additives to promote adhesion of plastisol coatings compositions based on poly(vinyl chloride) resin QYNV (a vinyl chloride homopolymer having an intrinsic viscosity of about 2.5).

In a manner similar to that described in Example 51, mixtures were prepared containing ingredients specified in Table VI in the proportions indicated. Wedge shape films were cast on unprimed steel (can makers quality) and the films were then baked 10 minutes at 350° Fahrenheit. Adhesion of these coatings was greatly superior to that exhibited by the control sample (plasticized with dioctyl phthalate) as shown in the table.

*Table VII*

| Ex. | Parts of Plasticizer Mix Per 100 Parts of VYHH Solids | Adhesion of Cast Flim (Force in Pounds Required to Remove 3 Mil (.003 inch) Film Per Inch Width of Knife) | Temperature in °C. |
|---|---|---|---|
| 67 | 30 | 58.6 | 40 |
| 68 | 40 | 49.1 | 40 |
| 69 | 50 | 62.4 | 25 |
| Control | ([1]) | 0.76 | 25 |

[1] No plasticizer used.

*Table VI*

| Ex. | Grams of Epoxide X[1] | Grams of Epoxide Z[2] | Grams of TDI[3] | Grams of DOP[4] | Grams of $BF_3 \cdot IprNH_2$[5] | Parts of Plasticizer Mixture Per 100 Parts of QYNV Resin | Hesion (Force Required to Remove 3 Mil (.003 inch) Film Per Inch Width of Test Knife) | Temp., °C. |
|---|---|---|---|---|---|---|---|---|
| 61 | 30 | | 6.62 | | 0.248 | 90 | 44.9 | 30 |
| 62 | 15 | 15 | 5.72 | | 0.248 | 90 | 42.3 | 30 |
| 63 | | 30 | 4.83 | | 0.248 | 90 | 32.1 | 30 |
| 64 | 29.4 | | 6.48 | 0.6 | 0.242 | 90 | 38.7 | 30 |
| 65 | 28.2 | | 6.21 | 1.8 | 0.233 | 90 | 31.5 | 25 |
| 66 | 27 | | 5.95 | 3.0 | 0.222 | 90 | 30.8 | 26 |
| Control | (Dioctyl Phthalate stabilized with 2 percent by weight of ERL-2774)[6] | | | | | 60 | 0.4 | 23 |

[1] Bis(3,4-epoxy-6-methylcyclohexylmethyl) adipate.
[2] Bis(3,4-epoxy-6-methylcyclohexylmethyl) sebacate.
[3] 2,4-toluenediisocyanate.
[4] Diocytyl phthalate.
[5] Boron trifluoride-isopropyl amine complex.
[6] Diglycidyl ether of 2,2-bis(para-hydroxyphenyl) propane.

EXAMPLE 70

To 10 grams of (3,4-epoxycyclohexylmethyl) (6-methyl-3,4-epoxycyclohexylmethyl) ether was added a solution of 0.1 gram of BF₃-piperidine dissolved in 1.72 grams of 2,4-toluenediisocyanate. This mixture was added to 13.3 grams of a poly(vinyl chloride) resin (Geon 121—B.F. Goodrich Company) and the resulting mixture was stirred until a smooth paste was obtained. A 6 mil (.006 inch) film of the paste was cast on aluminum foil and cured at 350° Fahrenheit for 10 minutes. A tough, hard film resulted which had a hydrocarbon extraction (in Apcothinner for 10 days at 25° centigrade) of 8.27 percent. A control film using dioctyl phthalate plasticizer showed 37.0 percent extraction in the same test.

EXAMPLE 71

This example illustrates the use of a polyepoxide which will dissolve the poly(vinyl chloride) resin to form a solution rather than a dispersion. 3.5 parts of VYHH (see Examples 67–69) were dissolved in 14.0 parts of 4-vinylcyclohexene dioxide, to make a 20 percent solution. To the clear solution, 5.28 parts of 3,3′-dimethyl-4,4′-biphenylene diisocyanate and 0.42 part of BF₃-piperidine were added.

A 10 mil (.010 inch) film was cast on glass and then baked at 100° centigrade for 15 minutes. The cured film was tough and clear, and exhibited excellent adhesion to the glass.

What is claimed is:

1. A polymerizable, curable composition of matter for producing polyurethanes which comprises: (a) a substantially hydroxyl-free monomeric polyepoxide; (b) an organic polyisocyanate in sufficient amounts to provide from about 0.05 to about 1.5 isocyanate groups for each epoxide group of said polyepoxide; and (c) at least 0.05 percent by weight, based on the weight of said polyepoxide, of boron trifluoride-amine complex, said complex being stable at room temperature but capable of dissociation at a temperature within the range of from about 60° centigrade to about 300° centigrade to release free boron trifluoride.

2. The polymerized, cured product obtained by heating the composition of claim 1.

3. A polymerizable, curable composition of matter for producing polyurethanes which comprises: (a) a substantially hydroxyl-free monomeric polyepoxide selected from the group consisting of monomeric diepoxides and mixures thereof; (b) a diisocyanate in sufficient amounts to provide from about 0.05 to about 1.5 isocyanate groups for each epoxide group in said polyepoxide, said diisocyanate being selected from the group consisting of alkylene, arylene and alkarylene diisocyanates and mixtures thereof; and (c) at least 0.05 percent, by weight, based on the weight of asid polyepoxide, of a boron trifluoride-amine complex selected from the group consisting of boron trifluoride-piperidine, boron trifluoride-ethylamine, boron trifluoride-isopropylamine, boron trifluoride-triethanolamine and mixtures thereof.

4. The polymerized cured product obtained by heating the composition of claim 3.

5. A polymerizable, curable composition for producing polyurethanes which comprises: (a) a substantially hydroxyl-free monomeric polyepoxide having at least two epoxide groups of the general formula

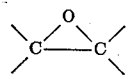

in each molecule thereof; (b) sufficient amounts of an organic polyisocyanate to provide from about 0.15 to about 0.7 isocyanate group for each epoxide group in said polyepoxide; and (c) from about 0.05 percent to about 5.0 percent by weight, based on the weight of said polyepoxide, of a boron-trifluoride-amine complex, said complex being stable at room temperature but capable of dissociation at a temperature within the range of from about 60° centigrade to about 300° centigrade to release free boron trifluoride.

6. A polymerizable, curable composition of matter for producing polyurethanes which comprises (a) a substantially hydroxyl-free diepoxide of the general formula:

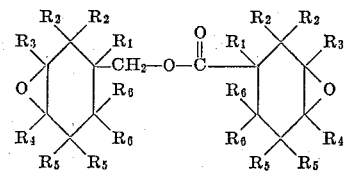

wherein any one of R₁, R₂, R₃, R₄, R₅ and R₆ represent members selected from the group consisting of hydrogen and lower alkyl radicals; (b) sufficient amounts of an organic polyisocyanate to provide from 0.05 to 1.5 isocyanate groups for each epoxide group in said diepoxide; and (c) from about 0.5 to about 5.0 percent by weight, based on the weight of said diepoxide, of a boron trifluoride-amine complex, said complex being stable at room temperature but capable of dissociation at a temperature within the range of from about 60° centigrade to about 300° centigrade to release free boron trifluoride.

7. A polymerizable curable composition of matter for producing polyurethanes which comprises (a) a substantially hydroxyl-free polyester of a 3,4-epoxycyclohexanecarboxylic acid and an organic polyol; (b) sufficient amounts of an organic polyisocyanate to provide from 0.05 to 1.5 isocyanate groups for each epoxide group in said polyesters; and (c) from about 0.05 to about 5.0 percent by weight, based on the weight of said polyester, of a boron trifluoride-amine complex selected from the group consisting of boron trifluoride-piperidine, boron trifluoride-ethylamine, boron trifluoride-isopropylamine, boron trifluoride-triethanolamine and mixtures thereof.

8. The composition of claim 7 further defined in that the said polyesters correspond to the general formula:

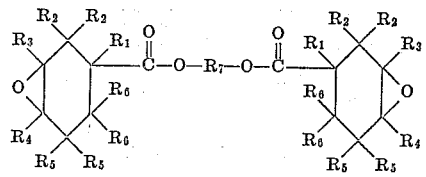

wherein any one of R₁ through R₆ represents a member selected from the group consisting of hydrogen and lower alkyl radicals and wherein R₇ is the residue of a dihydric alcohol selected from the group consisting of lower aliphatic hydrocarbon glycols and polyoxyalkylene glycols of the general formula

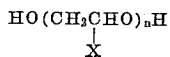

wherein X represents members of the group consisting of hydrogen and methyl groups and $n$ represents a positive integer in the range of from 2 through 3.

9. A polymerizable, curable composition of matter for producing polyurethanes which comprises (a) a substantially hydroxyl-free polyester of a 3,4-epoxycyclohexylmethanol and an organic polycarboxylic acid selected from the group consisting of aliphatic and aromatic polycarboxylic acids; (b) sufficient amounts of an organic polyisocyanate to provide from 0.05 to 1.5 isocyanate groups for each epoxide group in said polyester; and (c) from about 0.05 to about 5.0 percent by weight, based on the weight of said polyester, of a boron trifluoride-amine complex selected from the group consisting of boron trifluoride-piperidine, boron trifluoride-ethylamine, boron trifluoride-isopropylamine, boron trifluoride-ethanolamine and mixtures thereof.

10. A composition of matter as in claim 9 further defined in that the said polyester is a diester having the general formula:

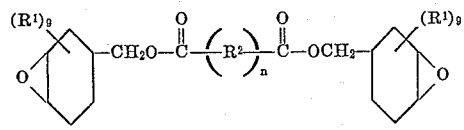

wherein each $R^1$ individually represents a member selected from the group consisting of hydrogen and lower alkyl, wherein $n$ represents an integer having a value in the range of from 0 to 1, and wherein $R^2$ represents a divalent organic hydrocarbon radical of from 1 to 10 carbon atoms derived from a member of the group consisting of aliphatic hydrocarbon dicarboxylic acids and aromatic hydrocarbon dicarboxylic acids.

11. A polymerizable, curable composition of matter for producing polyurethanes which comprises (a) a substantially hydroxyl-free epoxy ether having the general formula:

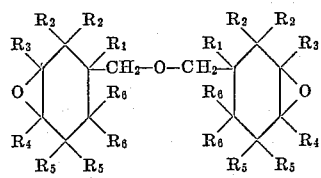

wherein any one of $R_1$ through $R_6$ represents a member selected from the group consisting of hydrogen and lower alkyl radicals; (b) sufficient amounts of an organic polyisocyanate to provide from 0.05 to 1.5 isocyanate groups for each epoxide group in said ether; and (c) from about 0.05 to about 5.0 percent by weight, based on the weight of said epoxy ether of a boron trifluoride-amine complex selected from the group consisting of boron trifluoride-piperidine, boron trifluoride-ethylamine, boron trifluoride-isopropylamine, boron trifluoride-triethanolamine and mixtures thereof.

12. A polymerizable, curable composition of matter for producing polyurethanes which comprises (a) a substantially hydroxyl-free glycidyl ether of a polyhydric phenol; (b) sufficient amounts of an organic polyisocyanate to provide from 0.05 to 1.5 isocyanate groups for each epoxide group in said glycidyl ether; and (c) from about 0.05 to about 5.0 percent by weight, based on the weight of said glycidyl ether, of a boron trifluoride-amine complex selected from the group consisting of boron trifluoride-piperidine, boron trifluoride-ethylamine, boron trifluoride-isopropylamine, boron trifluoride-triethanolamine and mixtures thereof.

13. A polymerizable, curable composition for producing polyurethanes comprising (a) substantially hydroxyl-free diglycidyl ether of bis(2,2'-para-hydroxyphenyl)propane; (b) sufficient amounts of 2,4-toluene-diisocyanate to provide from about 0.05 to about 1.5 isocyanate groups for each epoxide group in said aforementioned ether; and (c) from about 0.05 to about 5.0 percent by weight, based on the weight of said ether, of boron trifluoride-piperidine complex.

14. A polymerizable, curable composition of matter which comprises (a) a substantially hydroxyl-free monomeric polyepoxide; (b) an organic polyisocyanate in sufficient amounts to provide from 0.05 to about 1.5 isocyanate groups for each epoxide group of said polyepoxide; (c) from about 0.05 percent to about 5 percent by weight of said polyepoxide, of a boron trifluoride-amine complex, said complex being stable at room temperature but capable of dissociation at a temperature within the range of from about 60° centigrade to about 300° centigrade to release free boron trifluoride; and (d) from about 10 percent to about 95 percent by weight, based on the total weight of said composition, of vinyl chloride containing resin.

15. A polymerizable, curable composition of matter which comprises (a) a substantially hydroxyl-free monomeric polyepoxide, said polyepoxide being a liquid having a viscosity of less than about 6000 centipoises at 25° centigrade; (b) an organic polyisocyanate in sufficient amounts to provide from 0.05 to 1.5 isocyanate groups for each epoxide group of said polyepoxide; (c) from about 0.05 percent to about 5 percent by weight, based on the weight of said polyepoxide, of a boron trifluoride-amine complex, said complex being stable at room temperature but capable of dissociation at a temperature in the range of from about 60° centigrade to about 300° centigrade to release free boron trifluoride; and (d) from about 10 percent to about 80 percent by weight, based on the total weight of said composition, of a vinyl chloride containing resin.

16. A polymerizable, curable composition of matter as defined by claim 15, wherein the said monomeric polyepoxide is (3,4-epoxycyclohexylmethyl) (6-methyl-3,4-epoxycyclohexylmethyl)ether.

17. A polymerizable, curable composition of matter as defined by claim 15, wherein the said monomeric polyepoxide is 3,4-epoxy-6-methylcyclohexylmethyl-3,4-epoxy-6-methylcyclohexanecarboxylate.

18. A polymerizable, curable composition of matter as defined by claim 15, wherein the said monomeric polyepoxide is bis(3,4-epoxy-6-methylcyclohexylmethyl) adipate.

19. The polymerizable, curable composition of claim 6 wherein said diepoxide is 3,4-epoxy-6-methylcyclohexylmethyl 3,4-epoxy-6-methylcyclohexanecarboxylate.

References Cited by the Examiner

UNITED STATES PATENTS

| | | | |
|---|---|---|---|
| 2,698,315 | 12/54 | Greenlee | 260—77.5 |
| 2,716,123 | 8/55 | Frostich | 250—348 |
| 2,779,771 | 1/57 | Phillips | 260—45.8 |
| 2,824,083 | 2/58 | Parry | 260—2 |
| 2,830,038 | 4/58 | Pattison | 260—77.5 |
| 2,890,210 | 6/59 | Phillips | 260—78.4 |
| 2,909,494 | 10/59 | Parry | 260—47 |
| 2,959,571 | 11/60 | Faerber | 260—77.5 |
| 3,013,906 | 12/61 | Flowers | 260—75 |
| 3,120,502 | 2/64 | Merten | 260—77.5 |

OTHER REFERENCES

Lee and Neville, "Epoxy Resins," McGraw-Hill, 1957, page 159.

LEON J. BERCOVITZ, *Primary Examiner.*

HAROLD N. BURSTEIN, DONALD E. CZAJA,
*Examiners.*